Feb. 17, 1931.  W. C. WILCOXEN  1,792,953
MATERIAL HANDLING APPARATUS
Filed March 20, 1929  3 Sheets-Sheet 3
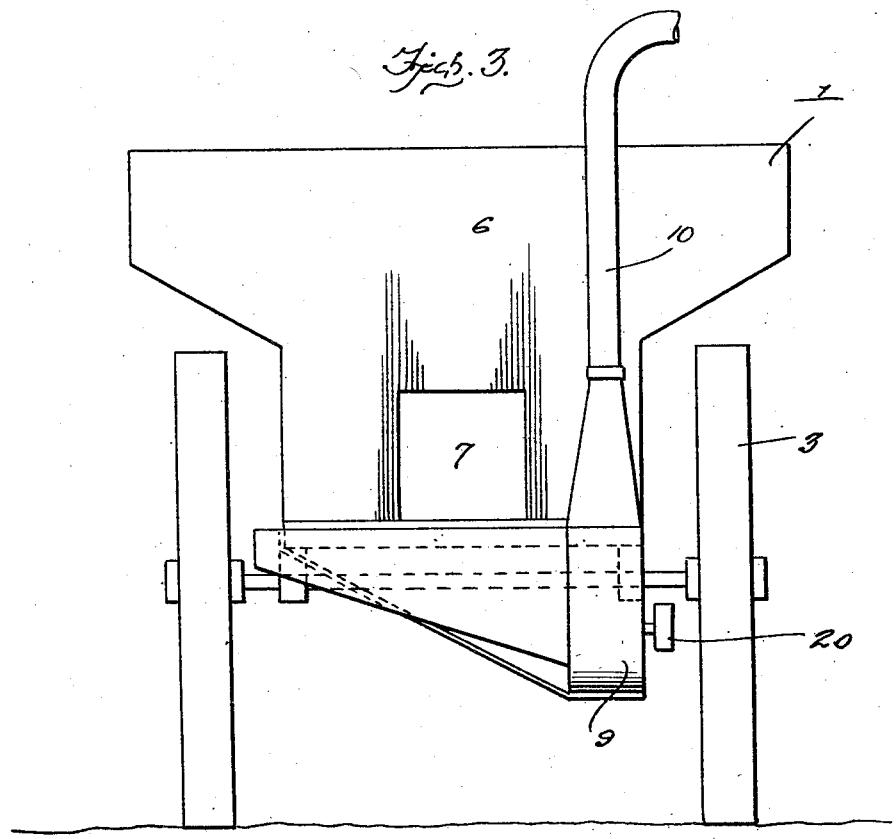
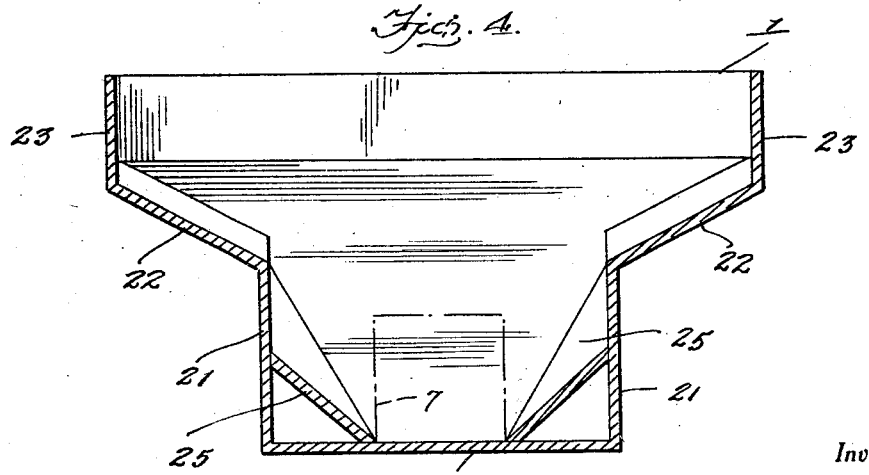
Inventor
William C. Wilcoxen
By Clarence A. O'Brien
Attorney Patented Feb. 17, 1931

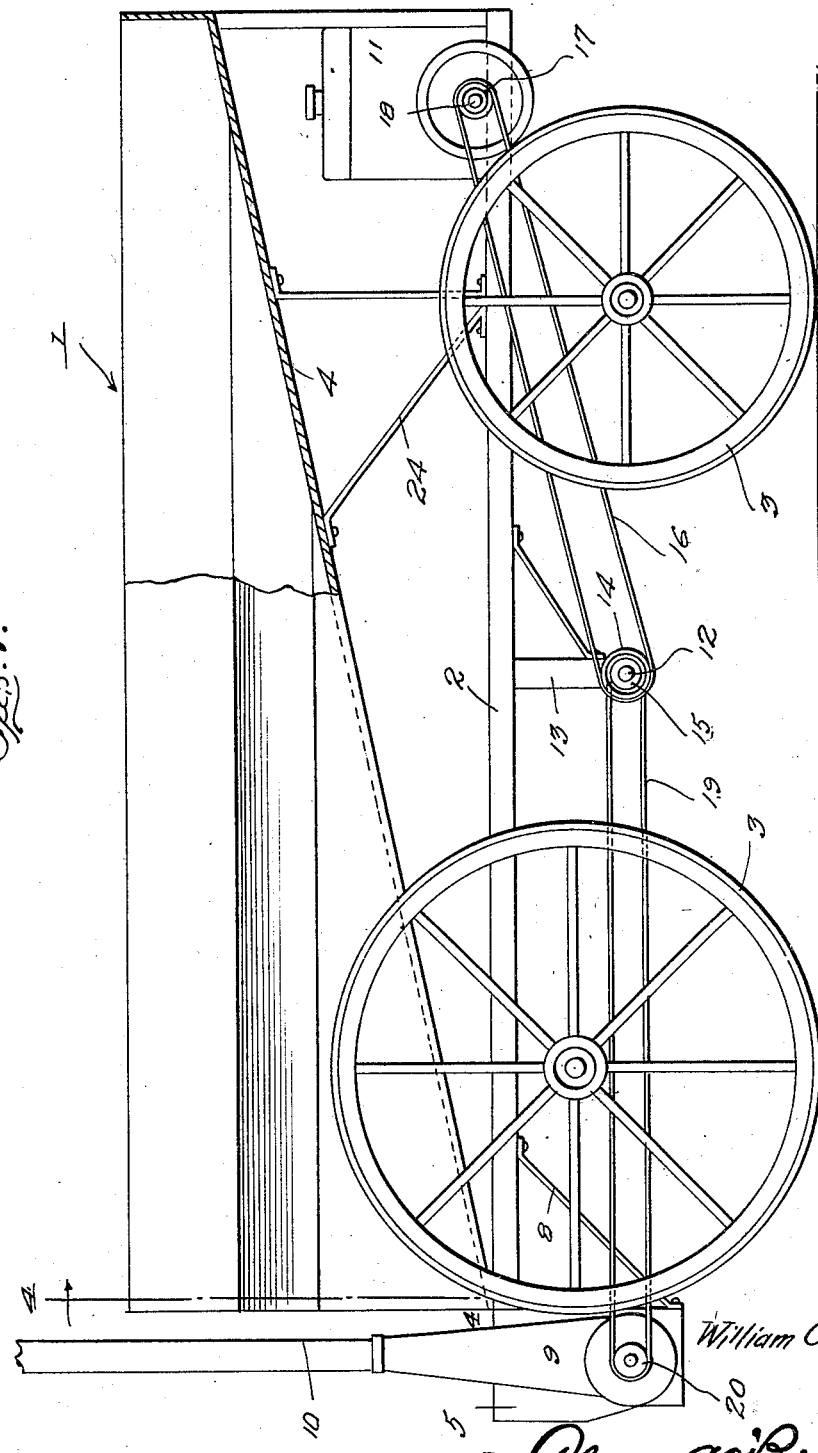

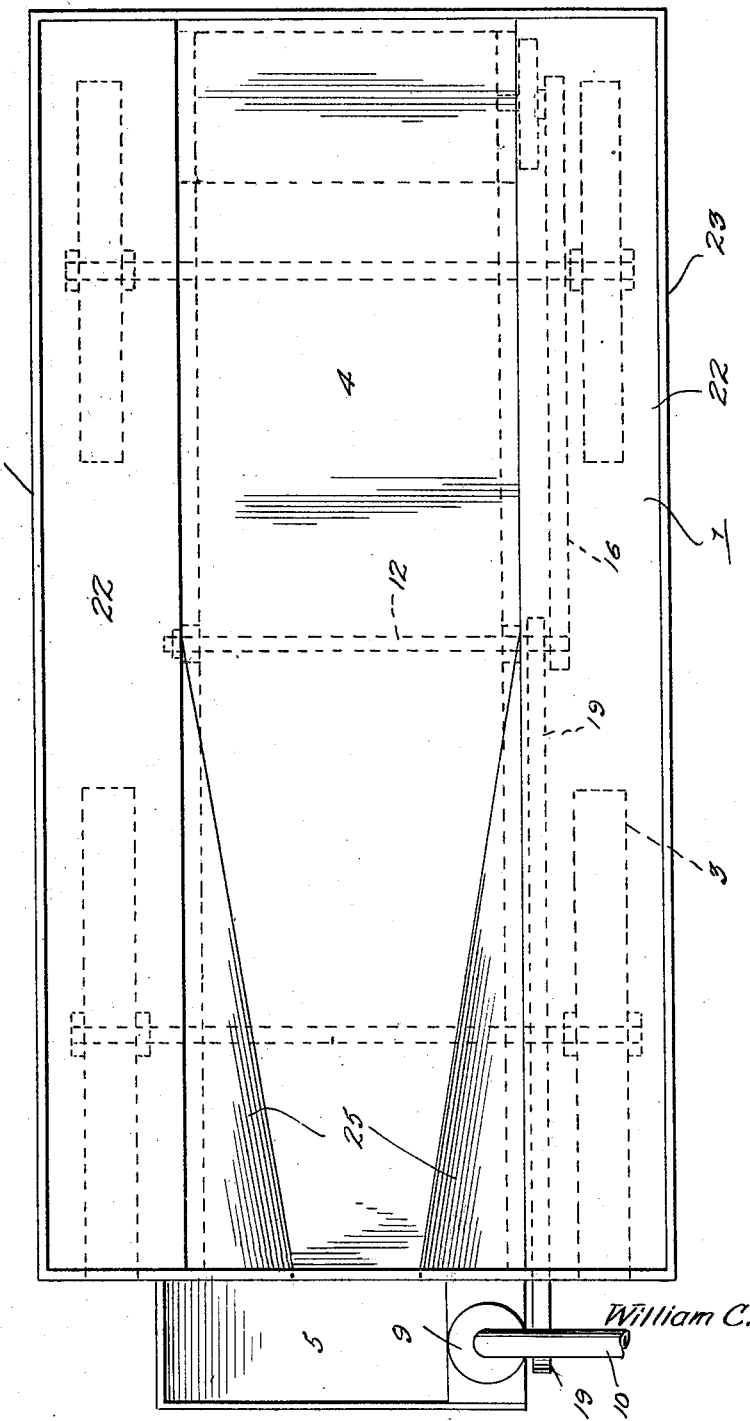

1,792,953

UNITED STATES PATENT OFFICE

WILLIAM C. WILCOXEN, OF FORD, KANSAS

MATERIAL-HANDLING APPARATUS

Application filed March 20, 1929. Serial No. 348,532.

The present invention relates to material handling apparatus and has reference more particularly to an apparatus of this character that is designed for use with a harvester, thresher, or the like, for receiving the grain that is dumped from the harvesting machine and for discharging the grain into a hopper from which the same is delivered to a granary.

One of the important objects of the present invention is to provide a structure of the above mentioned character wherein the body of the apparatus includes a rearwardly and downwardly sloping bin floor, as well as sloping side walls to facilitate the delivery of the grain that is dumped into the bin to be discharged into the hopper at the rear end of the bin by gravity, thus obviating the necessity of the operator having to constantly feed the grain to the hopper.

Another important object of the invention is to provide a portable apparatus that is simple in construction, inexpensive, strong and durable, and further well adapted to the purpose for which it is designed.

Other objects of the invention will become apparent as the description of the invention proceeds and when taken in connection with the accompanying drawings.

In the accompanying drawings, forming a part of this application, and wherein like reference characters designate like parts throughout the views:

Figure 1 is a side elevation of the apparatus embodying my invention, a portion of the body being broken away and shown in section.

Figure 2 is a top plan view thereof.

Figure 3 is a rear end elevation, and

Figure 4 is a vertical sectional view, taken approximately upon the line 4—4 of Figure 1, looking in the direction of the arrows.

In the drawings, wherein for the purpose of illustration is shown the preferred embodiment of my invention, the numeral 1 designates generally my improved apparatus, the same comprising a bin body of rectangular configuration that is adapted to be mounted on a running gear denoted generally by the numeral 2, of a wagon.

The wheels that travel along the ground are shown at 3, thus rendering the device portable. The bin includes a downwardly and rearwardly sloping floor 4, so that the rear end portion of the bin is of greater depth than the forward end portion, and supported at the rear end of the bin below the floor is the grain receiving hopper 5.

The floor of this hopper also slopes downwardly from one end to the other and the rear end wall 6 of the bin is formed with a grain discharge opening 7, whereby the grain will be delivered from the bin into the hopper 5 by gravity. The hopper 5 extends across the rear end portion of the bin below the discharge end 7, and may be supported upon the running gear in any appropriate manner, and suitable braces are provided for the hopper as shown at 8, in Figure 1.

A blower 9 of conventional construction is associated with the deeper end of the hopper and a discharge spout 10 extends upwardly from the blower for delivering the grain to a granary or other suitable storage place in the manner well known in the art.

The means for rotating the fan of the blower includes a small motor 11 mounted on the forward end of the running gear 2, below the sloping floor of the bin 1, and a jack shaft 12 is supported transversely below the intermediate portion of the running gear by suitable brackets 13.

A pair of pulleys 14 and 15, respectively, are secured on one end of the jack shaft. A belt 16 is trained over the pulley 14 and the pulley 17 that is arranged on the outer end of the drive shaft 18 of the motor 11 for driving the jack shaft 12.

A similar belt 19 is trained over the pulley 15 and the pulley 20 carried by the shaft on which the fan of the blower is mounted, so that the motor will operate the blower, in a manner as is readily obvious from the construction shown and above described.

The body of the grain bin includes the vertical side walls 21 that extend upwardly from the respective sides of the sloping floor 4, and the upper edges of the side walls 21 terminate in the upwardly inclined and outwardly extending side boards 22, and relatively short side walls 23, extend upwardly and perpendicular from the upper edges of the sloping side boards 22. The forward and rear end walls of the body are straight and merge with the respective ends of the floor 4. Suitable braces 24 are provided for supporting the bin 1 on the running gear, in a rigid manner.

The bin further includes the provision of the sloping guides 25, that are arranged in the rear end portion of the bottom of the bin, and as is clearly shown in Figure 2, these opposed guides diverge from the respective side edges of the discharge opening 7, and the forward ends of the sloping guides merge with the intermediate portions of the respective vertical side walls 21.

From the construction above described, it will be readily apparent that the grain that is discharged into the bin from the thresher or harvester will, by gravity, move rearwardly in the bin, and will be discharged through the opening 7 into the hopper 5, and by reason of the sloping floor of this hopper, the grain will be discharged into the blower 9 and this blower will, in turn, deliver the grain into a granary or other place of deposit.

By constructing a bin in the manner shown and described, it will not be necessary for the operator to feed the grain toward the discharge opening 7.

By rendering the bin portable, the same may be moved in the field from place to place and for disposition in cooperation with the harvester or thresher.

While I have shown the preferred embodiment of my invention, it is to be understood that various changes in the size, shape and arrangement of parts may be resorted to without departing from the spirit of the invention or the scope of the appended claim.

I claim:

In a grain bin of the class described, a body including a downwardly and rearwardly sloping floor, end walls extending upwardly from the respective ends of the floor, the rear end wall being formed with a discharge opening at the bottom thereof, side walls extending upwardly from the side edges of the floor, an elongated transversely disposed hopper supported at the rear end of the body below the discharge opening formed in the rear end wall, the hopper being provided with a sloping bottom and having means arranged in the deeper end of the hopper for discharging the material delivered to the hopper from the bin, and sloping guides arranged within the bin adjacent the respective sides thereof, said guides extending in diverging relation from the opposite side edges of the discharge opening to the intermediate portion of the adjacent side walls, the bin being narrower at its bottom portion than at its top, the side walls of the bin including upper and lower vertical portions, and sloping interconnecting portions between the adjacent vertical edges of the vertical portions.

In testimony whereof I affix my signature.

WILLIAM C. WILCOXEN.